United States Patent [19]  [11] 4,128,693
Dhami et al. [45] Dec. 5, 1978

[54] WIRE COATED WITH FLUOROCARBON BLEND

[75] Inventors: Kewal S. Dhami, Shrewsbury; Elmer W. Bennett, Westboro; Pearl Burton, Leominster, all of Mass.

[73] Assignee: International Telephone and Telegraph Corporation, New York, N.Y.

[21] Appl. No.: 794,313

[22] Filed: May 5, 1977

Related U.S. Application Data

[63] Continuation of Ser. No. 615,835, Sep. 9, 1975, abandoned.

[51] Int. Cl.² .................. B32B 15/00; B32B 27/00
[52] U.S. Cl. .............................. 428/379; 428/375; 428/422
[58] Field of Search ............ 428/375, 379, 383, 421, 428/422; 260/900, 87.5 A; 526/247

[56] References Cited

U.S. PATENT DOCUMENTS

| 2,998,332 | 8/1961 | Osdal | 428/383 |
| 3,159,609 | 12/1964 | Harris et al. | 526/247 |
| 3,352,714 | 11/1967 | Anderson et al. | 428/383 |
| 3,484,503 | 12/1969 | Magner et al. | 260/900 |

Primary Examiner—Lorraine T. Kendell
Attorney, Agent, or Firm—J. B. Raden; H. J. Holt

[57] ABSTRACT

A composition comprising a blend of (a) from 55 to 95% by weight of a tetrafluoroethylene polymer and (b) from 5 to 45% by weight of a copolymer of tetrafluoroethylene and an ether of the formula $CF_2=CF-O-R$, wherein R is a perfluoroalkyl radical of 1–5 carbon atoms, has markedly improved mechanical properties when used as a wire coating and particularly increased resistance to flex cracking as compared to polytetrafluoroethylene alone.

3 Claims, No Drawings

WIRE COATED WITH FLUOROCARBON BLEND

This is a continuation of application Ser. No. 615,835 filed Sept. 22, 1975, now abandoned.

This invention relates to wire coated with a blend of fluorocarbon resins.

Polytetrafluoroethylene possesses outstanding corrosion-resistance, thermal stability and dielectric properties making it very desirable for use as an electrical insulation on wire. However, polytetrafluoroethylene encounters flex cracking problems when used as an insulation, particularly in large thicknesses on large size conductors.

U.S. Pat. No. 3,132,123 discloses copolymers of tetrafluoroethylene and perfluoroalkyl perfluorovinyl ethers and suggests their use for wire and other types of coatings. However, such copolymers have limited use as wire coatings because of their low deformation resistance.

U.S. Pat. No. 3,484,503 discloses blends of from 50 to 90%, preferably 70–80%, of the foregoing tetrafluoroethylene-perfluoroalkyl perfluorovinyl ether copolymers with from 10 to 50% of tetrafluoroethylene homopolymers or copolymers. The blends are stated to have greater flow resistance at high temperatures than the tetrafluoroethylene-perfluoroalkyl perfluorovinyl ether copolymers and are indicated to be easier to fabricate and extrude than polytetrafluoroethylene. However, such blends are not suitable for use as wire coatings where high deformation resistance is required because they undergo an excessive amount of elongation upon flexing. Moreover, while such blends may be easier to extrude than polytetrafluoroethylene, they are nevertheless still extruded onto wire only with great difficulty.

It has now been found that wire coated with a composition comprising a blend of (a) from 55 to 95% by weight of a tetrafluoroethylene polymer and (b) from 5 to 45%, preferably 20–40%, by weight of a copolymer of tetrafluoroethylene and an ether of the formula $CF_2=CF-O-R$, wherein R is a perfluoroalkyl radical of 1-5 carbon atoms, shows a considerable reduction in flex cracking problems as compared to wire coated with polytetrafluoroethylene alone, while maintaining the extraordinary resistance to temperature, solvents and chemicals of polytetrafluoroethylene. In addition, and particularly at proportions of the copolymer at the higher end of the range (about 30–45%), the blend shows a marked improvement in mechanical properties of the coated wire.

The polytetrafluoroethylene polymer useful in the invention is a commercially available, solid, high melting macromolecular polymer having a melting point of about 327° C. The polymer is more particularly described in U.S. Pat. No. 2,393,967. The copolymers of tetrafluoroethylene and perfluoroalkyl vinyl ethers contain from 30 to 50 mole percent of the ether unit, have a melting point of 302°–310° C., an inherent viscosity of 0.5 to 2.0 and may be prepared as set forth in U.S. Pat. No. 3,132,123.

Polytetrafluoroethylene cannot be melt extruded because of its high melt viscosity. It is normally powder extruded in the presence of a solvent, such as naphtha or other extrusion aids. On the other hand, the perfluoroaklyl ether copolymer can be melt extruded. However, the presence of substantial proportions of polytetrafluoroethylene in a blend of polytetrafluoroethylene and tetrafluoroethylene-perfluoroalkyl perfluorovinyl ether copolymer renders their melt extrusion very difficult. It is accordingly preferred that the present wire coated products be powder extruded in the presence of a suitable solvent as an extrusion aid. This may be accomplished by blending together the polytetrafluoroethylene and tetrafluoroethylene-perfluoroalkyl perfluorovinyl ether copolymer, both in powder form, in the presence of a binder such as naphtha or other volatile hydrocarbon. The homogeneous blend is then pressure extruded onto the wire, using extrusion techniques conventional for polytetrafluoroethylene. Following extrusion, the coated wire is heated to about 315° to 375° C. to sinter the coating and volatilize off the naphtha or other binder.

The following examples illustrate the practice of the invention. All parts are by weight unless otherwise indicated.

EXAMPLE 1

A blend of 95 parts of polytetrafluoroethylene polymer (PTFE) and 5 parts of a tetrafluoroethylene-perfluoropropyl perfluorovinyl ether copolymer (PFA) was prepared by mixing the powders in the presence of 17 parts of naphtha in a vibrating mixer until the blend was homogeneous. The PTFE polymer was an extrusion grade sold commercially under the designation Teflon TFE. The PFA copolymer was that sold commercially under the designation Teflon PFA fluorocarbon resin — TE-9704. It has a specific gravity of 2.13-2.16, a melt flow number of 9–12 gm/10 min. and a water absorption of 0.03%. The blended powder was extruded at a pressure of 300–400 psi onto the surface of a 10 AWG nickel plated copper wire to form a 36 mil coating. The coated wire was then sintered at 425°–455° C. at the rate of 6 to 10 ft/minute.

EXAMPLE 2

For comparison, a second coated wire was prepared as set forth above from PTFE alone. The results of tests of the tensile strength and elongation properties of both coated products (cut longitudinally) are set forth in Table I.

TABLE I

| EXAMPLE | TENSILE STRENGTH (psi) | ELONGATION (%) at 20"/minute |
|---|---|---|
| 1. PTFE 95 parts PFA 5 parts | 4803 | 233 |
| 2. PTFE alone | 3936 | 240 |

The test results indicate substantially improved tensile strength for Example 1 containing only 5% PFA. The elongation properties did not differ significantly.

EXAMPLE 3

The following example illustrates the preparation of a three layered coated wire of a type in commercial use. The first layer contained the blended composition of the invention.

A blend was prepared of 80 parts of the PTFE polymer, 20 parts of the PFA copolymer and 0.07 parts of gray pigment. This blend was extruded onto a 1045/30 AWG nickel plated copper wire to form a 21 mil first coating. A second coating of 21 mil thickness of PTFE containing 0.07 parts gray pigment and 2.5 parts $Al_2O_3$ was extruded over the first coating. A third coating of 21 mil thickness of PTFE containing 0.07 parts gray pigment was extruded over the second coating. The three layer coating was then sintered at 425–455° C. at the rate of 6–10 ft./minute.

EXAMPLE 4

A three layer coated wire was prepared as in Example 3, except that the first coating contained 60 parts of PTFE and 40 parts of PFA. In all other respects, the coated product was the same.

EXAMPLE 5

For purposes of comparison, a coated wire was prepared as in Examples 3 and 4 except that the first layer was PTFE alone, rather than a blend. The mechanical properties of the coated wire product are shown in Table II for dumbells cut longitudinally. Elongation is given for dumbells cut both longitudinally and radially — polymers are normally oriented along their length and are therefore stronger in the longitudinal direction.

TABLE II

| Example | Tensile Strength (psi) | Flex Cracking (Cycles at 18° C) | Elongation (%) at 20"/Minute | |
|---|---|---|---|---|
| | | | Longitudinal | Radial |
| 3. PTFE 80 parts PFA 20 parts | 3858 | 9055 | 203 | 25 |
| 4. PTFE 60 parts 40 parts | 4629 | 7000 | 270 | 115 |
| 5. PTFE alone | 2854 | 1117 | 172 | 0.50 |

The Table shows that with from 20 to 40 parts of PFA, tensile strength and elongation were markedly improved as compared with the coating containing only PTFE. The number of cycles at which flex cracking occurs was very significantly extended by the presence of PFA.

An attempt was made to prepare a coated wire from a 50—50 blend of PFA-PTFE. The high melt viscosity of the blend made it very difficult to prepare by melt extrusion techniques. Accordingly, a powder blend of 50 parts of PFA and 50 parts of PTFE in 17 parts of naphtha was prpared as in Examples 1 through 5. The mixture was quite powdery and the mass did not hold together as well as the blends containing from 5 to 40 parts of PFA. A three layer coating was pressure extruded onto wire; as in Example 3, the coated wire differing from Example 3 only in the higher PFA content in the inner coating. The wire had a very rough surface and, after sintering at 454° C., had an unacceptably large number of burns.

We claim:
1. Wire coated with an extruded coating composition comprising a blend of
   (a) from 55 to 95% by weight of a tetrafluoroethylene polymer and
   (b) from 5 to 45% by weight of a copolymer of tetrafluoroethylene and an ether of the formula $CF_2=CF-O-R$ wherein R is a perfluoroalkyl radical of 1–5 carbon atoms.
2. The wire of claim 1 coated with a composition comprising a blend of (a) 60 to 80% of the polymer and (b) 20 to 40% of the copolymer.
3. The wire of claim 1 in which R is a perfluoropropyl radical.

* * * * *